(12) United States Patent
Brescoe et al.

(10) Patent No.: US 11,389,894 B2
(45) Date of Patent: Jul. 19, 2022

(54) LASER WELDING METHOD

(71) Applicant: Coherent, Inc., Santa Clara, CA (US)

(72) Inventors: Ryan Brescoe, Ontario (CA);
Jean-Philippe Lavoie, Santa Clara, CA (US)

(73) Assignee: Coherent, Inc., Santa Clara, CA (US)

( * ) Notice: Subject to any disclaimer, the term of this patent is extended or adjusted under 35 U.S.C. 154(b) by 214 days.

(21) Appl. No.: 16/786,623

(22) Filed: Feb. 10, 2020

(65) Prior Publication Data

US 2020/0254562 A1 Aug. 13, 2020

Related U.S. Application Data

(60) Provisional application No. 62/805,244, filed on Feb. 13, 2019.

(51) Int. Cl.
| | | |
|---|---|---|
| *B23K 26/06* | (2014.01) | |
| *B23K 26/082* | (2014.01) | |
| *B23K 26/70* | (2014.01) | |
| *B23K 26/073* | (2006.01) | |
| *B23K 26/22* | (2006.01) | |
| *B23K 103/10* | (2006.01) | |
| *B23K 103/04* | (2006.01) | |

(52) U.S. Cl.
CPC ...... *B23K 26/0626* (2013.01); *B23K 26/0665* (2013.01); *B23K 26/0734* (2013.01); *B23K 26/082* (2015.10); *B23K 26/22* (2013.01); *B23K 26/702* (2015.10); *B23K 2103/04* (2018.08); *B23K 2103/10* (2018.08)

(58) Field of Classification Search
CPC ............ B23K 26/0626; B23K 26/0734; B23K 26/702; B23K 26/082; B23K 26/22

USPC .............. 219/121.6, 121.61, 121.64, 121.72
See application file for complete search history.

(56) References Cited

U.S. PATENT DOCUMENTS

| | | | |
|---|---|---|---|
| 6,311,099 B1 * | 10/2001 | Jasper | B23K 26/032 |
| | | | 219/121.6 |
| 9,482,821 B2 | 11/2016 | Huber et al. | |
| 2016/0016261 A1 * | 1/2016 | Mudd, II | B23K 26/32 |
| | | | 219/121.61 |
| 2018/0147661 A1 * | 5/2018 | Salokatve | B23K 26/0869 |
| 2019/0118299 A1 * | 4/2019 | Kangastupa | B23K 26/0734 |

(Continued)

FOREIGN PATENT DOCUMENTS

| | | | |
|---|---|---|---|
| JP | 58-159514 A | 9/1983 | |
| WO | WO-2016198724 A2 * | 12/2016 | ......... B23K 26/0608 |

(Continued)

OTHER PUBLICATIONS

International Search Report and Written Opinion received for PCT Patent Application No. PCT/US2020/017085, dated May 20, 2020, 10 pages.

*Primary Examiner* — Thien S Tran
(74) *Attorney, Agent, or Firm* — Morrison & Foerster LLP (57) ABSTRACT

A method for laser keyhole welding of metal alloys is disclosed. The method independently adjusts power in a focused center beam and power in a concentric focused annular beam. At the termination of a weld, the power in the center beam is initially ramped up and then ramped down, while the power in the annular beam is ramped down. Increasing the power in the center beam enables a controlled and prolonged contraction of the keyhole and melt pool, thereby preventing undesirable cracking.

18 Claims, 5 Drawing Sheets

(56) References Cited

U.S. PATENT DOCUMENTS

2019/0383998 A1    12/2019  Kangastupa
2020/0254562 A1*    8/2020  Brescoe ................. B23K 26/22
2020/0306878 A1*   10/2020  Kangastupa ....... B23K 26/0096

FOREIGN PATENT DOCUMENTS

WO         2018/011456 A1     1/2018
WO    WO-2018011456 A1 *     1/2018    ......... G02B 6/02042
WO    WO-2019129917 A1 *     7/2019    ......... B23K 26/0604

* cited by examiner

LASER WELDING METHOD

PRIORITY

This application claims priority to U.S. Provisional Application Ser. No. 62/805,244, filed Feb. 13, 2019, the disclosure of which is incorporated herein in its entirety.

TECHNICAL FIELD OF THE INVENTION

The present invention relates in general to welding using focused beams of laser-radiation. The invention relates in particular to welding metal alloys using a focused center beam and a focused annular beam.

DISCUSSION OF BACKGROUND ART

Beams of laser-radiation are increasingly used for cutting, drilling, welding, marking, and scribing workpieces made of a wide range of materials; including metals and metal alloys. Traditional mechanical processing produces unwanted defects, such as micro-cracks that may propagate when a processed workpiece is stressed, thereby degrading and weakening the processed workpiece. Laser processing minimizes such unwanted defects, is generally cleaner, and causes a smaller heat-affected zone. Laser machining uses a focused laser beam to produce precise cuts and holes, having high-quality edges and walls, while minimizing the formation of unwanted defects.

In laser welding, a focused laser beam locates each weld spot or seam precisely, while minimizing collateral heating. It is useful to distinguish two main laser welding regimes. Conduction welding occurs at lower laser powers and lower power densities. Absorbed laser power heats the irradiated material, melting material in each part to be joined, which flows, mixes, and then solidifies. Keyhole welding occurs at higher laser powers and higher power densities that are sufficient to vaporize some of the irradiated material. Pressure of the vaporized material on surrounding melted material opens a channel through the melted material, having a characteristic narrow and deep profile. Finished keyhole welds are generally narrower, deeper, and stronger than conduction welds. However, it can be difficult to maintain a stable keyhole in a hot and dynamic pool of melted material.

One problem when laser welding some metals and metal alloys is the formation of defects, particularly cracks, at the termination of a laser weld. Some defects are caused by stress that is induced while the workpiece is cooling. These initial defects weaken a welded workpiece and may further propagate if thermal or mechanical stress is applied when the finished welded workpiece is used. An unreliable weld could lead to catastrophic failure. One known solution to mitigate termination defects is to ramp down the laser power rapidly at the termination of a weld, rather than switching off the power digitally. Another known solution is to rapidly lift the focused beam at the termination of a weld, thereby illuminating a progressively larger area on the workpiece with a progressively lower intensity beam. Although these solutions have been successful for many materials, they have proven insufficient for modern high-strength alloys or metals having relatively high thermal conductivity. These materials remain stubbornly prone to cracking at the beginning and/or termination of a laser weld, particularly at the termination of a laser weld.

There is need for a simple and reliable process to laser weld metals and metal alloys that are particularly prone to cracking at the termination of a weld. Preferably, the process would not compromise any of the advantages of contemporary laser welding, such as weld speed, precision, weld quality, and cost-per-weld.

SUMMARY OF THE INVENTION

A method for laser welding a workpiece in accordance with the present invention comprises delivering a focused beam of laser-radiation to the workpiece. The focused beam has a focused center beam and a concentric focused annular beam. The focused center beam is smaller than the focused annular beam at a focus on the workpiece. The focus is moved laterally with respect to the workpiece from a start location towards a stop location. The center beam has a center processing power and the annular beam has an annular processing power. The annular beam is ramped down from the annular processing power to an off-power over a ramping-down time when the focus reaches the stop location. The center beam is ramped up from the center processing power over a first time duration, then the center beam is ramped down to an off-power over a second time duration. The first time duration is during the ramp-down time.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1A:
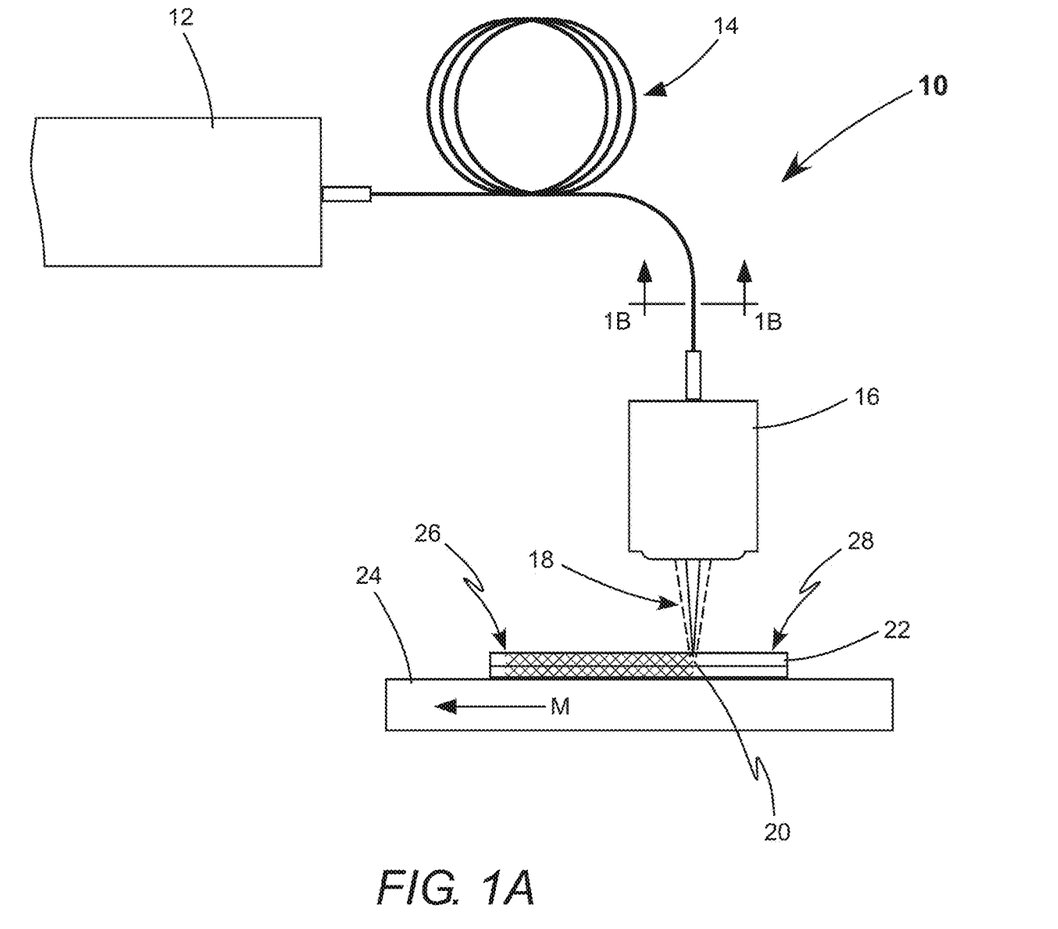
FIG. 1A is a side-view, partially in cross-section, schematically illustrating one preferred embodiment of laser welding apparatus for implementing the laser welding method of the present invention, the apparatus including a laser source generating at least two beams of laser-radiation, an optical fiber, and a focusing lens.
Figure 1B:
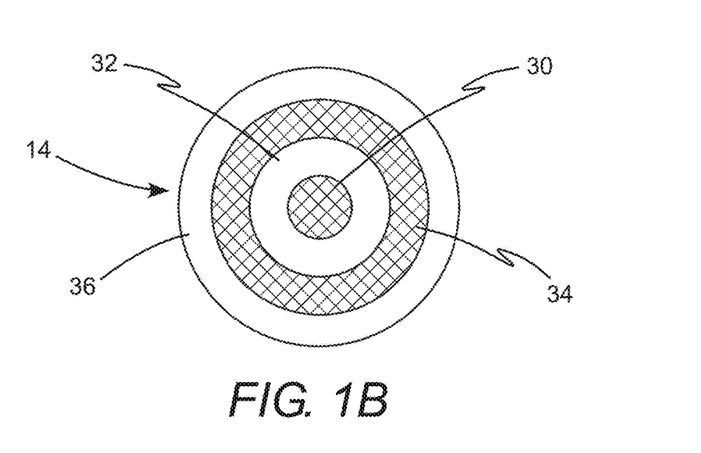
FIG. 1B is a cross-sectional view schematically illustrating details of the optical fiber of FIG. 1A, which has a center core for guiding a center beam and an annular core for guiding an annular beam.

Referring now to the drawings, wherein like components are designated by like numerals, FIGS. 1A and 1B schematically illustrate an apparatus 10 used in prior-art laser processing methods and which is used in the laser welding method of the present invention. In both the prior-art and current methods, a laser source 12 delivers at least two beams of laser-radiation through an optical fiber 14 to a focusing lens 16. Optical fiber 14 includes a center core 30 for guiding a center beam of laser-radiation. Center core 30 has a low refractive index cladding 32. Optical fiber 14 further includes an annular core 34 for guiding an annular beam of laser-radiation. Annular core 34 is concentrically located between low refractive index cladding 32 and a low refractive index cladding 36. Laser source 12 is configured to deliver the center beam to center core 30 and the annular beam to the annular core 34. Laser systems integrating such a laser source with such an optical fiber are commercially available. For example, the Highlight™ FL-ARM laser from Coherent Inc. of Santa Clara, Calif. One feature of this laser is that optical powers of the center beam and annular beam can be selected and adjusted independently.

Focusing lens 16 forms a focused beam 18, comprising a focused center beam depicted as converging solid lines and a concentric focused annular beam depicted as converging dashed lines. The focused beams converge towards a focus 20, where the focused center beam has a much smaller diameter than the concentric focused annular beam. Apparatus 10 may also include an optional beam expander, not depicted here, located between optical fiber 14 and focusing lens 16. Focusing lens 16 is depicted here as a fiber-coupled lens assembly, which are usually arranged to allow internal expansion of beams emerging from the optical fiber, prior to focusing.

Focused beam 18 is directed onto a workpiece 22, which initially comprises two pieces to be welded together. In the drawing, two pieces being lap welded are depicted in cross section along the weld. Workpiece 22 is supported and moved by a translation stage 24. Focus 20 is located close to a top surface of workpiece 22, which could be above, on, or below the surface. For lap welding, the focus is preferably at a depth of focus between about 1 millimeters (mm) above the surface and about 2 mm below the surface. The two pieces of workpiece 22 may be coated or uncoated. The two pieces of workpiece 22 may be in direct contact or may be separated by a small gap. For example, zinc coated steel is commonly welded with a gap of up to a few hundred microns to allow high-pressure zinc vapor to escape.

During welding, translation stage 24 is moved laterally, as indicated by vector M. The weld is depicted as hatching on workpiece 22. There is a desired start location 26 and a desired stop location 28 for the weld in workpiece 22. Laterally moving workpiece 22 moves focus 20 relative to workpiece 22, from start location 26 to stop location 28. Apparatus 10 may be configured to move focusing lens 16 laterally, to move focus 20 with respect to workpiece 22. A focusing lens assembly may also incorporate galvanometer-actuated mirrors and a flat-field objective to move focus 20 with respect to workpiece 22.

Figure 2A:
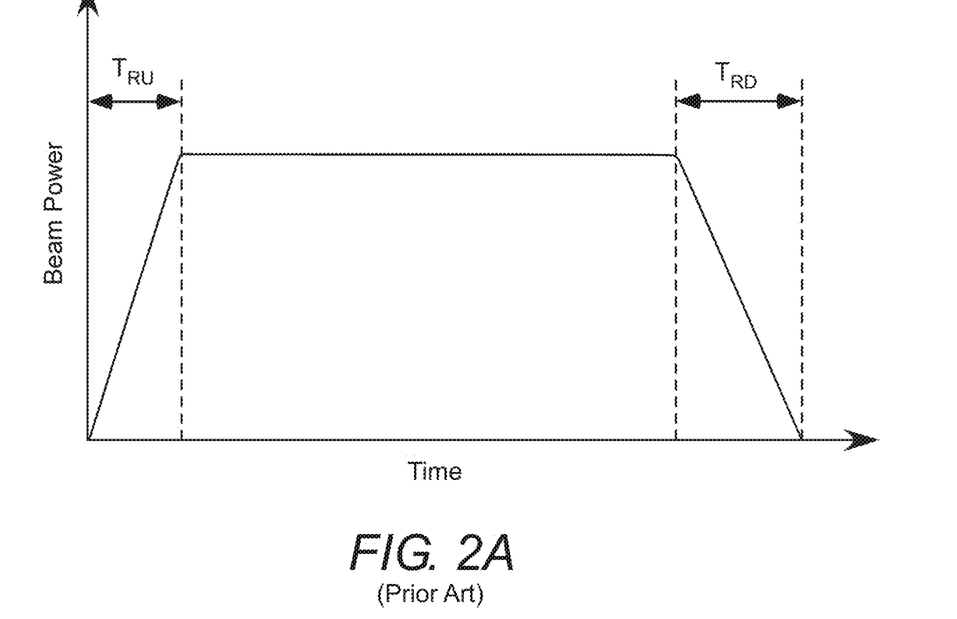
FIG. 2A is a graph of beam power vs. time, schematically illustrating a prior-art welding method using a conventional optical fiber having only a center core.

FIG. 2A is a graph schematically illustrating power in a beam of laser-radiation vs. time for a prior-art laser welding method using a conventional optical fiber. A conventional optical fiber has just one beam guided through one center core. There is no annular core. The focus is initially located at the start location. The beam power is ramped up from about 0 watts (Watts) to a processing power over a ramping-up time $T_{RU}$ at the start location. The beam power is ramped down from the processing power to 0 W over a ramping-down time $T_{RD}$ at the stop location. Between ramping up and ramping down, the beam has the processing power and moves laterally at a processing velocity between the start location and the stop location.

Figure 2B:
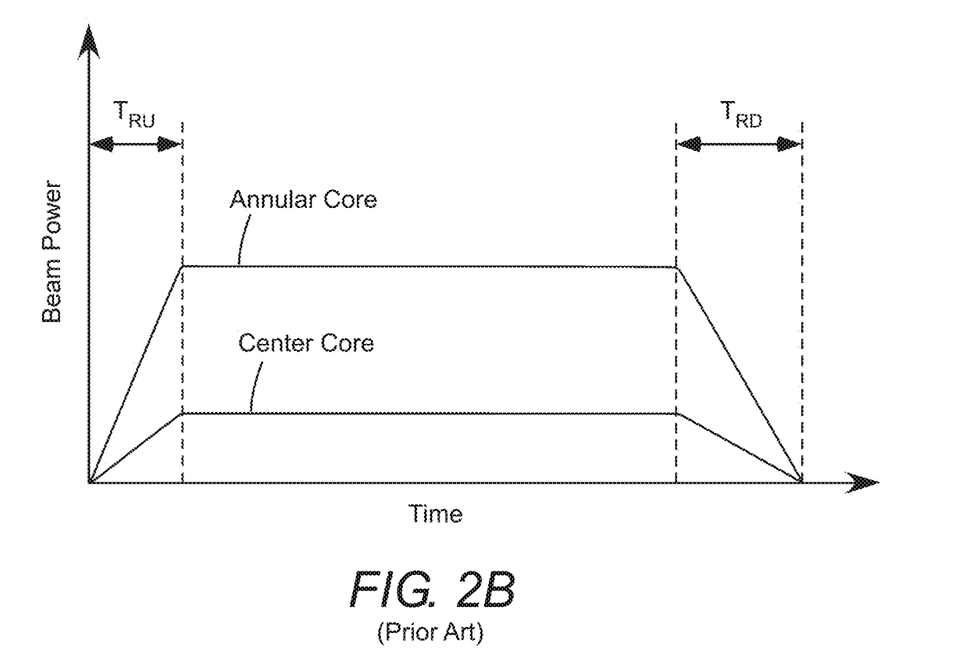
FIG. 2B is a graph of beam power vs. time, schematically illustrating a prior-art welding method using an optical fiber having a center core and an annular core.

FIG. 2B is a graph schematically illustrating power in the center core and power in the annular core vs. time for a laser welding method using optical fiber 14. Each beam has a processing power between $T_{RU}$ and $T_{RD}$. The respective processing powers are selected to optimize a welding process. There is an optimal ratio of power in the focused center beam to power in the focused annular beam, depending on the material the workpiece is made of and the thickness of the workpiece. The respective beam powers of both beams are ramped up during $T_{RU}$ and ramped down during $T_{RD}$. The method of FIG. 2B is sufficient for some materials. For example, ramping the power is often sufficient to prevent cracking at the start and stop locations in regular steel alloys. However, for other materials, the inventors observe cracking and other defects at the stop location of a welded workpiece. For example, for high-strength steel, dual-phase steel, martensitic steel, and aluminum. As discussed above, such defects weaken the welded workpiece and can cause premature failure of the finished workpiece when it is stressed in an application.

Figure 3A:
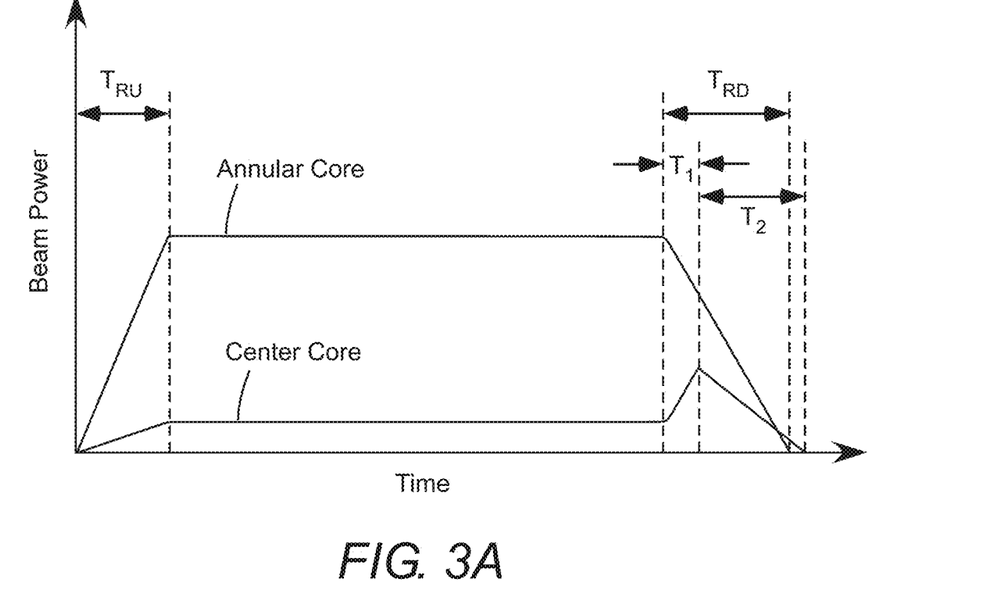
FIG. 3A and FIG. 3B are graphs of power vs. time, schematically illustrating one embodiment of laser welding method in accordance with the present invention.
Figure 3B:
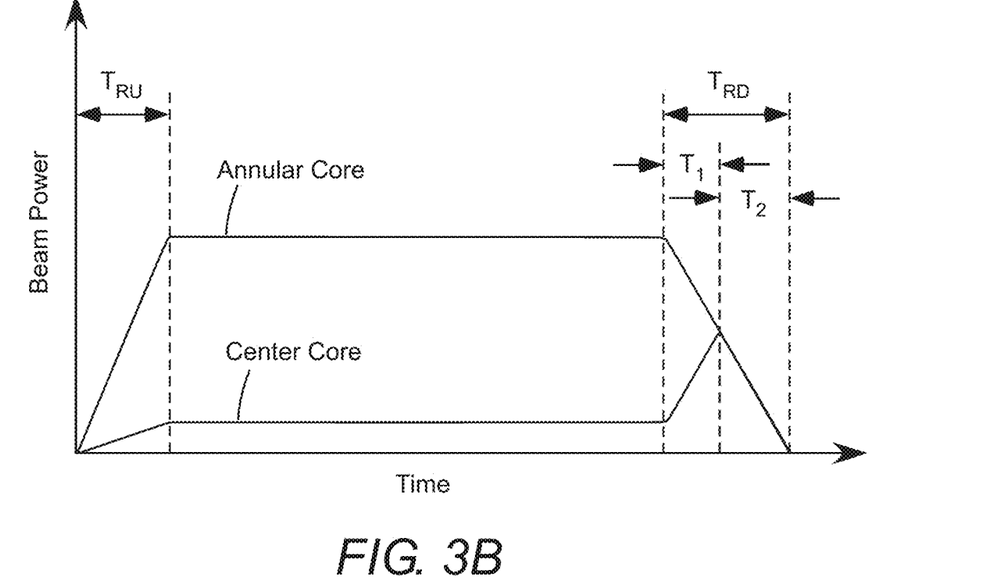

FIGS. 3A and 3B are graphs schematically illustrating power in the center core and power in the annular core vs. time for one preferred embodiment of a laser welding method in accordance with the present invention. For laser welding high-strength steel alloys, the inventors determined that the optimal ratio of power in the center beam to power in the annular beam is small, preferably less than 1:5, and most preferably less than 1:10. When focus 20 reaches stop location 28, power in the focused annular beam is ramped down from the annular processing power to 0 W during $T_{RD}$. From the beginning of $T_{RD}$, the power in the focused center beam is ramped up from the center processing power at a first ramp rate, over a time duration $T_1$. The power in the focused center beam is then ramped down to 0 W at a second ramp rate, over a time duration $T_2$.

FIG. 3A represents a general implementation of the inventive method, whereby the total ramping time $T_1+T_2$ of the center beam is more than (depicted) or less than the ramping time $T_{RD}$ of the beam. FIG. 3A depicts the first and second ramp rates of the power in the center beam being less than the ramp rate of the power in the annular beam during $T_{RD}$. Therefore, the overall power density in focused beam 18 at focus 20 ramps down at three different and progressively slower rates. For the ramping times and ramping rates depicted in FIG. 3A, the ratio of power in the center beam to power in the annular beam increases throughout $T_1$ and $T_2$.

FIG. 3B represents one preferred implementation, whereby the total ramping time $T_1+T_2$ is equal to the ramping time $T_{RD}$; the first ramp rate of power in the center core during $T_1$ is equal, but opposite in sign, to the ramp rate of power in the annular core during $T_{RD}$; and the ramp rate of the power in the center core during $T_2$ is equal to the ramp rate of the power in the annular core during $T_{RD}$. Therefore, the overall power density in focused beam 18 at focus 20 is unchanged during $T_1$ and then ramps down linearly during $T_2$. The ratio of power in the center beam to power in the annular beam increases throughout $T_1$.

The inventive method prevents cracking and other defects at the stop location by reducing the dimensions of the melt zone and keyhole in a controlled manner, which prolongs the keyhole welding condition during $T_{RD}$. The keyhole is terminated when it reaches dimensions comparable to those it would have if only the center core had been used in the welding. High-strength steels have inherently high internal stress compared to conventional steel alloys due to their proprietary atomic compositions, developed for high mechanical strength. By shrinking the keyhole and melt zone before reaching the conduction welding condition, residual stress is confined to a smaller volume. Overall, the cooling rate around the melt zone is reduced, allowing the solidified material in this volume to anneal. Annealing the just-solidified material further minimizes subsequent cracking and defect formation.

Focus 20 is moved continuously relative to workpiece 22 during the whole time depicted in FIGS. 3A and 3B, with $T_{RU}$ and $T_{RD}$ synchronized with passage of focus 20 through start location 26 and stop location 28, respectively. Alternatively, the motion may terminate at the beginning of $T_{RD}$, at the end of $T_{RD}$, or the end of $T_2$. The ramp down in beam powers may coincide with the deceleration of the focus relative to the workpiece from the processing velocity to being stationary. However, in all cases, the keyhole welding condition terminates at stop location 28. As one of skill in the art would recognize, the processing powers between $T_{RU}$ and $T_{RD}$ may be modulated, without departing from the spirit and scope of the present invention. For example, the total processing power may be reduced when transitioning from a thinner section to a thicker section of the workpiece or while welding a tight radius or while welding a corner.

Figure 4A:
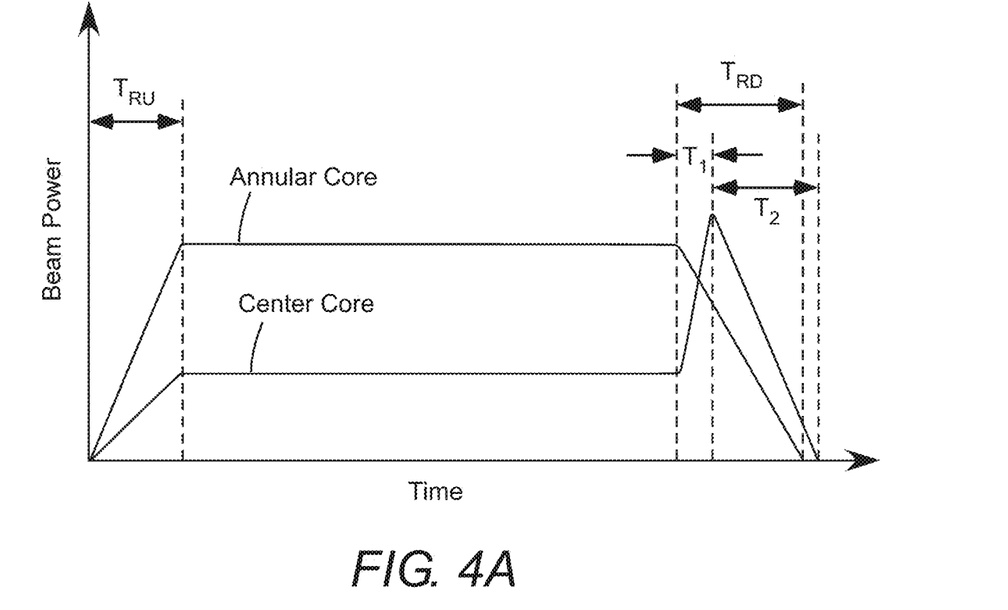
FIG. 4A and FIG. 4B are graphs of power vs. time, schematically illustrating another embodiment of laser welding method in accordance with the present invention.
Figure 4B:
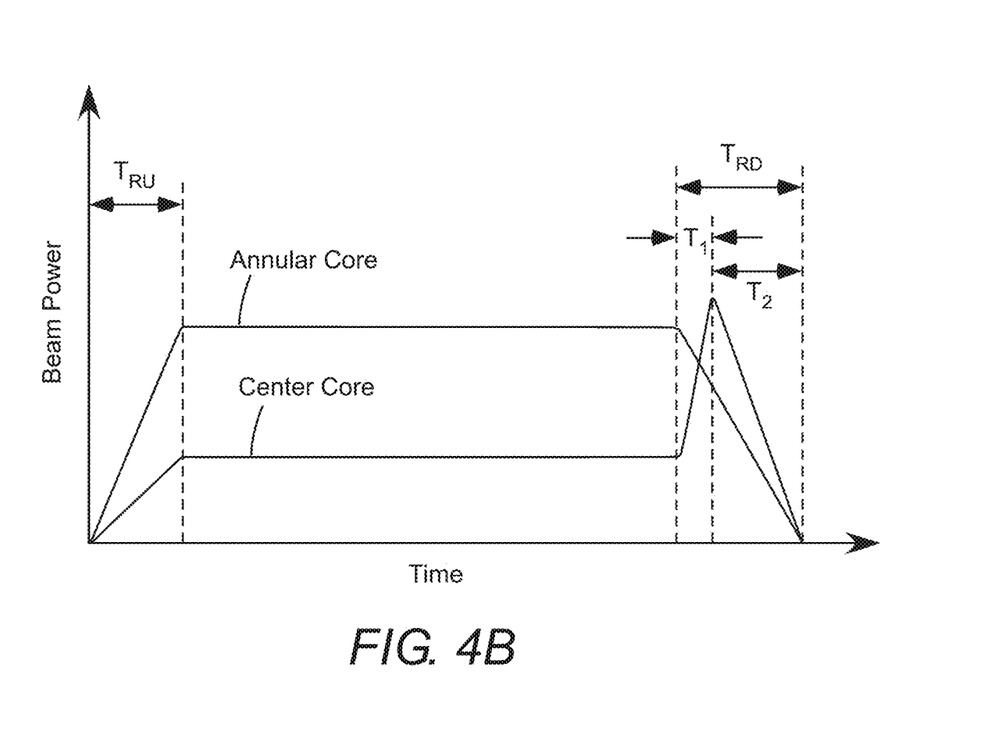

FIGS. 4A and 4B are graphs schematically illustrating power in the center core and power in the annular core vs. time for another preferred embodiment of a laser welding method in accordance with the present invention. The method of FIGS. 4A and 4B is similar to the method of FIGS. 3A and 3B, with an exception that the first ramp rate of the power in the center core during $T_1$ is greater than the absolute ramp rate of the power in the annular core during $T_{RD}$. This method is advantageous for metal alloys having relatively high thermal conductivity, such as aluminum alloys. These alloys are prone to solidification cracking due to high rates of cooling that induce stress. To overcome the rapid temperature decline while power in the annular core is ramped down, the power in the center core is ramped up rapidly to compensate. For aluminum alloys, the inventors determined that the power in the center beam should preferably be less than the power the annular beam during welding. The optimal ratio is most preferably less than 1:1.6.

Figure 5A:
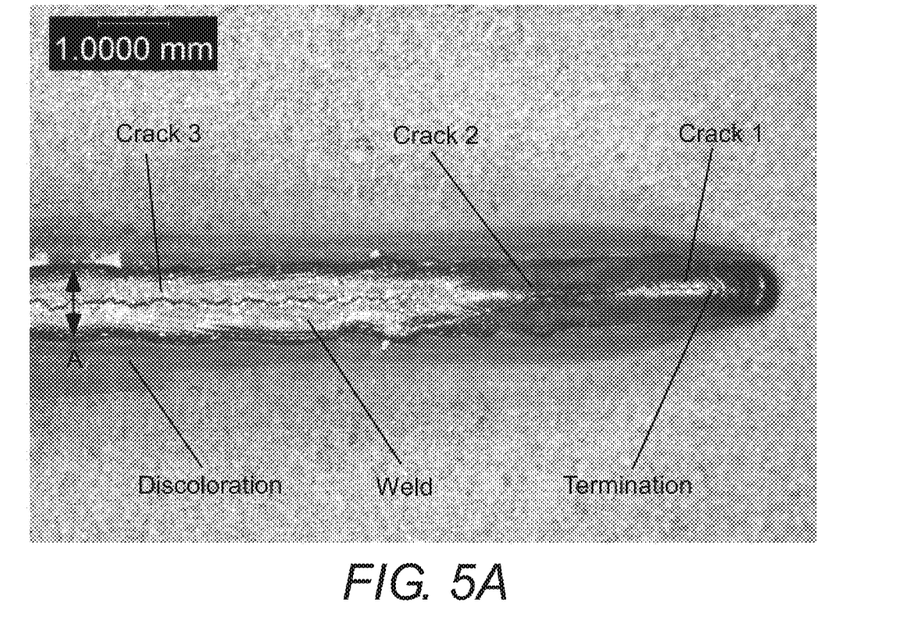
FIG. 5A is a magnified plan-view of a lap weld in a high-strength steel alloy workpiece that was made by a prior-art method, the photograph showing cracks near the termination of the weld.

FIG. 5A is a plan-view magnified photograph showing the termination of a lap weld in a high-strength steel workpiece that was made by a prior-art method, similar to FIG. 2B. The focused beam was scanned from left to right in the photograph. Welded material having a bright appearance is bordered by a duller discolored surface, which is heat discoloration, due to a zinc surface coating being burned off during welding. The width A of the weld is approximately the diameter of the focused annular beam. A stress crack 1 formed simultaneously with or immediately after the material cooled. Another crack 2 formed later and yet another crack 3 formed even later. It is very likely that crack 1 initiated crack 2 and likely that crack 2 initiated crack 3. These cracks extend from the visible surface into the workpiece.

Figure 5B:
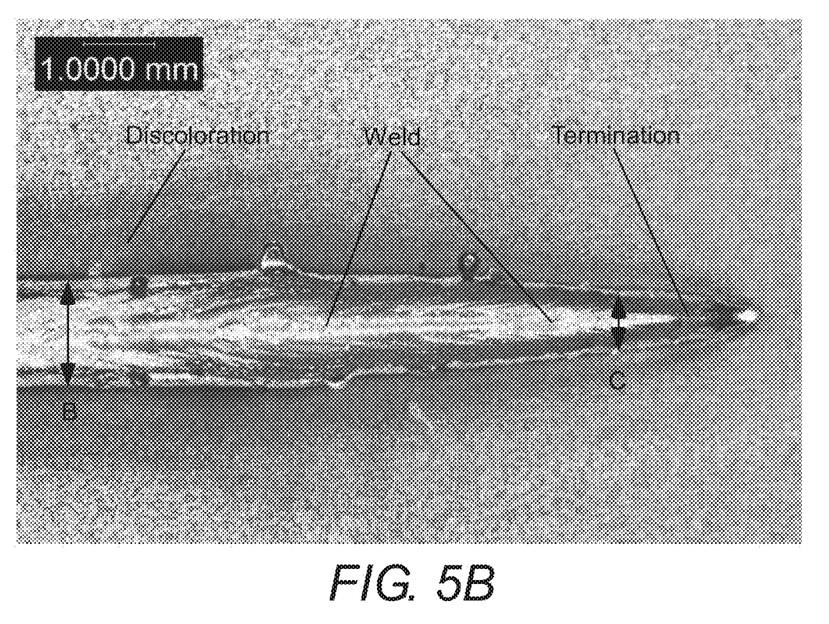
FIG. 5B is a magnified plan-view of a lap weld in a workpiece, identical to that of FIG. 5B, made using the inventive method of FIG. 3B, the photograph showing that the weld is crack-free.

FIG. 5B is a plan-view magnified photograph showing the termination of a lap weld in an identical high-strength steel workpiece to that of FIG. 5A, but welded using the inventive method of FIG. 3B. Again, welded material has a bright appearance, with the width B of the weld being approximately the diameter of the focused annular beam. The weld tapers to a smaller width towards the termination; for example, width C. The termination is at about the location of the focused beam when the keyhole finally collapsed. This tapering is a result of the controlled reduction in the dimensions of the melt zone and the keyhole, discussed above. This weld is crack-free. Any residual stress in this taper is minimized and any elevated residual stress about the termination is confined to a minimal volume.

The inventive method of FIGS. 3A and 3B can be applied to a variety of alloys. For example, the high-strength steel alloys "Gen3" and "XGen3", which are third-generation steels as known in the art. The method can also be applied to Usibor® and Ductibor® branded steels, which are commercially available from ArcelorMittal S.A. of Luxembourg, Luxembourg. The inventive method of FIGS. 4A and 4B can be applied to all 5xxx series, 6xxx series, and 7xxx series aluminum alloys, for example. The method can also be applied to dual-phase steels, such as DP600.

The method of FIG. 3B was demonstrated by lap welding two 1.4 mm thick pieces of Gen3 1180 high-strength steel alloy. The lap welding fully penetrated both pieces. The center beam had a beam-parameter product of about 2 and the annular beam had a beam-parameter product of about 8. The focused center beam had a diameter of about 225 micrometers (μm) and the focused annular beam had diameter of about 575 μm. The focus was located on the top surface of the workpiece or equivalently at a depth-of-focus of about 0 μm. The focus was moved laterally with respect to the workpiece at a speed of about 70 millimeters per second (mm/s). The power of the center beam was about 300 W and the power of the annular beam was about 3500 W during welding. The power in the annular beam was ramped down over a time $T_{RD}$ of about 150 milliseconds (ms), which corresponds to a rate of about −25 W/ms. The power in the center beam was ramped up over a time $T_1$ of about 55 ms at a rate of about +32 W/ms, then ramped down over a time $T_2$ of about 95 ms at a rate of about −23 W/ms. The lap weld was thus terminated without any detectable cracking. In general, a welding speed of between about 50 mm/s and about 200 mm/s would be practical, while a ramp down time $T_{RD}$ of between about 10 ms and about 200 ms would be practical.

Although lap welding a workpiece was used as an example, one of skill in the art would recognize that the inventive method could be applied to edge, fillet, seam, or butt welding. Generally, stress-induced defects tends to occur at the termination of a weld. However, the invention disclosed herein could also be adapted to prevent defects at the start of a weld. In particular, power in the center beam could be ramped up at a higher rate than power in the annular beam, to control the initial melting and opening of the keyhole, then to control the growth of the keyhole and melt zone.

Although linear power ramping was shown and discussed herein, for simplicity of illustration and description, the inventive welding method could be further optimized by using other types of power ramping of the center beam and/or annular beam. For example, exponential power ramping. Similarly, the inventive welding method could be further optimized by adding more ramping steps, in addition to the first ramp and second ramp, described above.

Although the beams are shown and described herein having a power of about 0 W at the beginning and termination of welding, the beams could be ramped up from or ramped down to any off-power. An "off-power" means a power that is too low to melt an exposed area of the workpiece and too low to damage the workpiece.

The present invention is described above in terms of a preferred embodiment and other embodiments. The invention is not limited, however, to the embodiments described and depicted herein. Rather, the invention is limited only by the claims appended hereto.

What is claimed is:

1. A method for laser welding a workpiece, comprising the steps of:
   delivering a focused beam of laser-radiation to the workpiece, the workpiece including two pieces to be lap welded, the focused beam having a focused center beam and a concentric focused annular beam, the focused center beam being smaller than the focused annular beam at a focus on the workpiece;
   moving the focus laterally with respect to the workpiece from a start location towards a stop location, the center beam having a center processing power and the annular beam having an annular processing power;
   ramping down power of the annular beam from the annular processing power to an off-power over a ramping-down time $T_{RD}$ when the focus reaches the stop location; and
   ramping up power of the center beam from the center processing power over a first time duration $T_1$, then ramping down the power of the center beam to an off-power over a second time duration $T_2$, the first time duration $T_1$ being during the ramping-down time $T_{RD}$.

2. The method for laser welding of claim 1, wherein the beam of laser-radiation is delivered from a laser source to a focusing lens by an optical fiber, the focusing lens forming the focused beam.

3. The method for laser welding of claim 2, wherein the optical fiber includes a center core for guiding the center beam and an annular core for guiding the annular beam.

4. The method for laser welding of claim 1, wherein the focus is located at a depth of focus with respect to a surface of the workpiece that is in a range between 1 millimeter above the surface and 2 millimeters below the surface.

5. The method for laser welding of claim 1, wherein the two pieces are separated by a small gap.

6. The method for laser welding of claim 1, wherein a ratio of the center processing power to the annular processing power is less than 1:1.6.

7. The method for laser welding of claim 6, wherein the ratio of the center processing power to the annular processing power is less than 1:5.

8. The method for laser welding of claim 7, wherein the ratio of the center processing power to the annular processing power is less than 1:10.

9. The method for laser welding of claim 1, wherein the off-power is 0 watts.

10. The method for laser welding of claim 1, wherein the off-power is less than a power to melt a surface of the workpiece.

11. The method for laser welding of claim 1, wherein the power in the center beam is ramped up at a rate during the first time duration that is less than an absolute rate of ramping down the power in the annular beam.

12. The method for laser welding of claim 1, wherein the sum of the first and second time durations of the center beam is equal to the ramping-down time of the annular beam.

13. The method for laser welding of claim 12, wherein the power in the center beam is ramped up at a rate during the first time duration that is equal to an absolute rate of ramping down the power in the annular beam.

14. The method for laser welding of claim 13, wherein the power in the center beam is ramped down at a rate during the second time duration that is equal to a rate of ramping down the power in the annular beam.

15. The method for laser welding of claim 1, wherein the power in the center beam is ramped up at a rate during the first time duration that is greater than an absolute rate of ramping down the power in the annular beam.

16. The method for laser welding of claim 1, wherein the focus is moved laterally with respect to the workpiece at a speed in a range between 50 millimeters per second and 200 millimeters per second.

17. The method for laser welding of claim 1, wherein the ramping-down time of the annular beam is in a range between 10 milliseconds and 200 milliseconds.

18. The method for laser welding of claim 1, wherein the workpiece is made of a material selected from the group consisting of Gen3 steel alloy, XGen3 steel alloy, DP600 steel alloy, 5xxx series aluminum alloy, 6xxx series aluminum alloy, and 7xxx series aluminum alloy.

* * * * *